June 26, 1956 G. L. READE ET AL 2,751,744
CORN SAVER ATTACHMENT
Filed Aug. 24, 1953
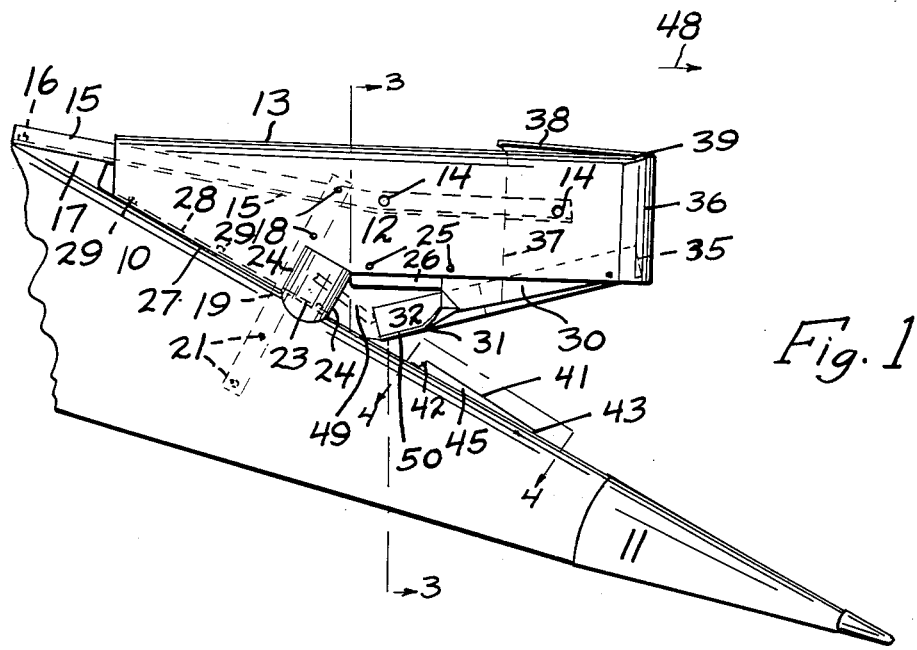
Fig. 1
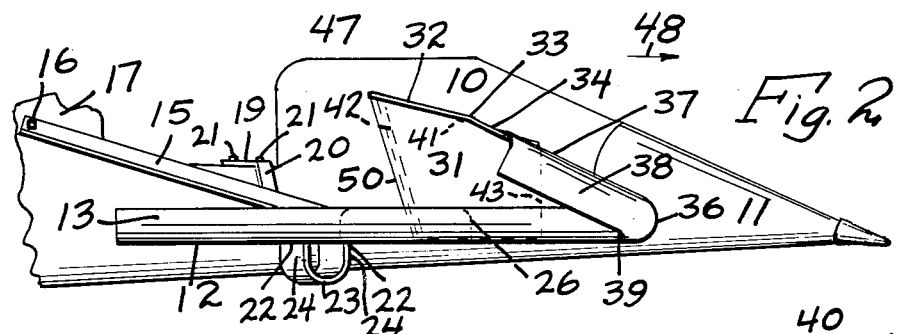
Fig. 2
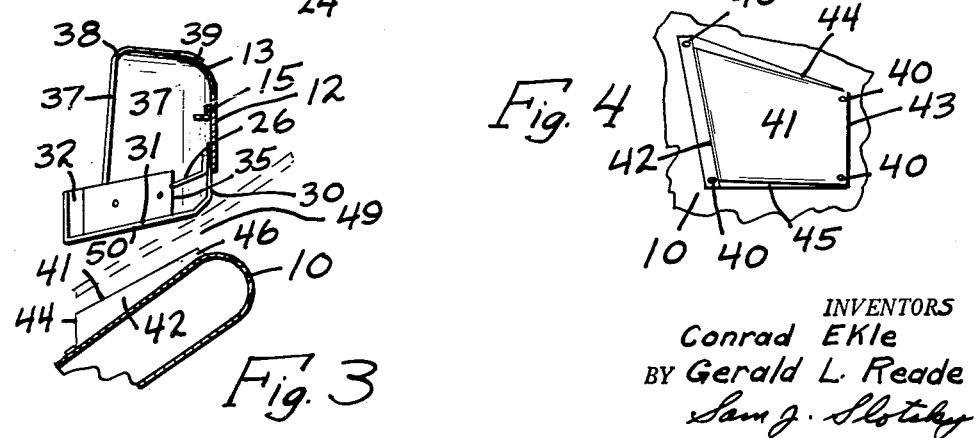
Fig. 3
Fig. 4
INVENTORS
Conrad Ekle
BY Gerald L. Reade
Sam J. Slotsky
ATTORNEY

United States Patent Office 2,751,744
Patented June 26, 1956

2,751,744

CORN SAVER ATTACHMENT

Gerald L. Reade and Conrad Ekle, Canton, S. Dak.

Application August 24, 1953, Serial No. 376,066

4 Claims. (Cl. 56—119)

Our invention relates to a corn saver attachment.

An object of our invention is to provide an attachment which can be readily secured in any desired manner to corn picker aprons, so that the ears of corn which are normally lost during the corn picking operation will be concentrated back onto the aprons and be carried by the usual snapping rolls and conveyor mechanism into the husking bed or other portions of the apparatus.

A further object of our invention is to provide an attachment which is relatively light and simple in construction, and which will efficiently gather any of the ears which may tend to deviate from the normal path.

With these and other objects in view, our invention consists in the construction, arrangement, and combination of the various parts of our device, whereby the objects contemplated are attained, as hereinafter more fully set forth, pointed out in our claims, and illustrated in the accompanying drawings, in which:

Figure 1 is a side elevation of our attachment as attached to a corn picker apron, Figure 2 is a plan view of Figure 1, Figure 3 is a sectional view of Figure 1 taken generally along the lines 3—3 of Figure 1, and Figure 4 is a plan view taken along the lines 4—4 of Figure 1.

In the present type of corn picker, as the picker travels along the row, the tendency for the conveying and snapping roll mechanism is to cause a certain amount of vibration in the stalk, which in many cases, due to the fact that the stalk is relatively dry or weakend by corn borers, causes ears of corn to be dislodged from the stalk, which ears will drop outside of the aprons and this corn will thus be wasted. Also, in many cases where the stalks are bent over at a substantial angle laterally, the outer ears will become lost or wasted, and the principal objective of our invention is to prevent such wastage and to concentrate and direct all of the ears into the aprons so that the ears are thereby efficiently gathered and conveyed upwardly.

We have used the character 10 to designate generally a side apron of a corn picker, there usually being two of such aprons, with the usual snapping rolls and conveyor mechanism being positioned between, such conveyor and snapping roll mechanism not being shown herein since they are not essential to the invention, and it should also be understood that any other shape of apron 10 can be adapted to our device, as well as the forward gathering portions 11. The character 12 indicates a vertical frame member preferably made of sheet metal, which terminates at its upper end in the inwardly curled or bent portion 13, and secured at 14 to the member 12 is an angle member 15 which is bolted as at 16 to the portion 17 of the picker. Also secured to the member 12 at 18 is a bracket member 19 which is bent inwardly at 20 and is attached as at 21 to the corn picker portions as shown in Figure 2.

Secured to the member 12 at 22 is a substantially semi-cylindrical deflector member 23 having the side portions 24, and attached at 25 to the member 12 is a further inwardly bent downwardly inclined flange 26 (see Figure 3).

The member 12 includes the angular lower edge 27 which is bent into the flange 28 to provide means for attaching the member 12 at 29 to the apron 10.

Also secured to the member 12 is the vertical member 30 which is bent into the downwardly inclined platform 31 which platform 31 terminates in a further vertical flange 32, which flange 32 is bent at 33 into the further portion 34 which passes forwardly and terminates at 35 within the forward end portion 36 of the member 12, and secured to the flange portion 34 is a substantially vertically positioned deflecting wall member or portion 37 which is curled at its upper portion 38 and is suitably secured at 39 to the forward portion 36, it being noted that the wall 37 is inclined slightly as shown in Figure 3.

Attached at 40 to the apron 10 is a diverting plate member 41 having the upper end wall 42, this plate sloping downwardly to its lower edge 43, and having the further side walls 44 and 45, it being noted that the lowest end of the wall 42 is greater in height than its upper end 46 as viewed in Figure 3, it also being noted that the wall portion 42 slopes downwardly and inwardly toward the snapping rolls and conveying portions which will be approximately within the space 47 (see Figure 2), it also being noted that the slope of the wall 42 is such as to convey the ears of corn toward the standard conveying portions of the picker before they can escape forwardly of the unit.

The attachment operates in the following manner. As the unit travels forwardly in the direction of the arrow 48, it will be noted that the deflecting wall 37 will have the pronounced tendency of concentrating the ears of corn toward the center of the aprons, and it will be further noted that any ears that are dislodged by vibration, etc., will fall onto the platform portion 31 and will then gravitate downwardly to the apron 10 whereby they will fall into the conveying portions.

Also, the flange portion 26 will assist this action and will tend to keep the inwardly gathered ears from falling out of the opening or space at 49, the opening at 49 which is between the member 23 and the platform 31, being provided to assist in gathering the ears from the stalks which are bent over at a rather extreme angle (see dotted constructions Figures 1 and 3) and which would otherwise slide beneath the platform 31, it being noted that by virtue of this opening the ears on these bent-over stalks will impinge against the member 23 and since this member is rounded, these ears will not be pulled off but will pass back through the opening 49 whereby they will then be gathered in the normal manner. The ears that fall off of the platform edge 50 (see Figure 2) will roll downwardly a very slight distance until they strike the wall 42, and due to the shape of the wall and the inclination thereof, these ears will be readily directed into the snapping rolls and conveying portions of the machine. The slope of the wall 37 as viewed from Figure 2 concentrates the stalks inwardly also, and it will thus be noted that in spite of whichever position the stalk lies, or whichever condition is encountered, the ears will be concentrated and gathered before they can fall onto the ground.

It will now be seen that we have provided the various advantages set forth in the objects of our invention with various other advantages being readilly apparent.

Some changes may be made in the construction and arrangement of the parts of our invention without departing from the real spirit and purpose of our invention, and it is our intention to cover by our claims any modi-

We claim as our invention:

1. A corn saver attachment comprising a vertically positioned frame member, means for attaching said frame member to a corn picker apron, a downwardly inclined platform positioned generally at right angles to said frame member and attached thereto, said platform including an inner vertically positioned flange at the lower terminal thereof, whereby ears of corn will be entrapped on said platform and will gravitate downwardly towards said apron.

2. A corn saver attachment comprising a vertically positioned frame member, means for attaching said frame member to a corn picker apron, a downwardly inclined platform positioned generally at right angles to said frame member and attached thereto, said platform including an inner vertically positioned flange at the lower terminal thereof, whereby ears of corn will be entrapped on said platform and will gravitate downwardly towards said apron, a deflecting wall portion attached to the outer end of said frame member and converging from said end.

3. A corn saver attachment comprising a vertically positioned frame member, means for attaching said frame member to a corn picker apron, a downwardly inclined platform positioned generally at right angles to said frame member and attached thereto, said platform including an inner vertically positioned flange at the lower terminal thereof, whereby ears of corn will be entrapped on said platform and will gravitate downwardly towards said apron, a deflecting wall portion attached to the outer end of said frame member and converging from said end, a rounded deflector member attached to said frame member, and being spaced from said platform to provide a space, said rounded deflector member being adapted to prevent ears from being torn off of bent stalks when said stalks pass within said space.

4. A corn saver attachment comprising a vertically positioned frame member, means for attaching said frame member to a corn picker apron, a downwardly inclined platform positioned generally at right angles to said frame member and attached thereto, said platform including an inner vertically positioned flange at the lower terminal thereof, whereby ears of corn will be entrapped on said platform and will gravitate downwardly towards said apron, a deflecting wall portion attached to the outer end of said frame member and converging from said end, a rounded deflector member attached to said frame member, and being spaced from said platform to provide a space, said rounded deflector member being adapted to prevent ears from being torn off of bent stalks when said stalks pass within said space, a diverting member attached to said apron beneath said platform, said diverting member having an upper wall portion sloping downwardly along said apron, and sloping toward the conveyor portions adjacently to said apron, and adapted to convey ears of corn to said apron.

References Cited in the file of this patent

UNITED STATES PATENTS

| | | |
|---|---|---|
| 1,233,418 | Stone | July 17, 1917 |
| 1,342,640 | Meilicke | June 8, 1920 |
| 2,133,905 | Rund | Oct. 18, 1938 |
| 2,252,377 | Hyman | Aug. 12, 1941 |